United States Patent [19]

Kallenborn

[11] 4,158,555

[45] Jun. 19, 1979

[54] METHOD OF CUTTING OF GLASS STRAND AND PRODUCT PRODUCED THEREBY

[75] Inventor: John Kallenborn, Murrysville, Pa.

[73] Assignee: PPG Industries, Inc., Pittsburgh, Pa.

[21] Appl. No.: 642,526

[22] Filed: Dec. 19, 1975

[51] Int. Cl.² ............................................ C03B 37/00
[52] U.S. Cl. ........................................ 65/2; 65/11 R; 65/113; 83/913; 156/62.4; 156/180; 156/251; 156/272; 219/121 LM; 428/296; 428/392
[58] Field of Search ................ 65/2, 11 R, 11 W, 112, 65/269, 3 R, 113; 83/913; 264/157; 219/121 M, 121 LM; 428/364, 392, 296; 156/272, 251, 180, 62.4; 331/DIG. 1

[56] References Cited

U.S. PATENT DOCUMENTS

| 2,786,637 | 3/1957 | Russell et al. | 65/11 W X |
| 3,322,584 | 5/1967 | Welin-Berger | 156/251 X |
| 3,369,101 | 2/1968 | Curcio | 219/121 M |
| 3,684,474 | 8/1972 | Chisholm | 65/112 X |
| 3,750,049 | 7/1973 | Dowley et al. | 219/121 LM X |
| 3,869,268 | 3/1975 | Briar et al. | 65/2 |

OTHER PUBLICATIONS

IBM Technical Disclosure Bulletin, vol. 18, #5, 10/1975, pp. 1426, 1427.

*Primary Examiner*—Robert L. Lindsay, Jr.
*Attorney, Agent, or Firm*—John E. Curley; Alan T. McDonald

[57] ABSTRACT

A method of cutting glass fiber strands is disclosed wherein said strands are driven across the beam of an interruptable laser. The laser beam melts the strand at each pulse of the beam cutting the strand into short lengths. The cut strands can be immediately collected and packaged or can be further subjected to a drying procedure prior to packaging. The strands formed by this method have fused and comparitively even ends as opposed to the ragged uneven ends of mechanically chopped glass strands.

24 Claims, 4 Drawing Figures

METHOD OF CUTTING OF GLASS STRAND AND PRODUCT PRODUCED THEREBY

BACKGROUND OF THE INVENTION

Chopped fiber glass strand is commonly formed by mechanically chopping a continuous glass fiber strand either from a forming package or directly as the strand is attenuated from a bushing. A typical process for chopping fiber glass strand wet in a forming operation is the process described in U.S. Pat. No. 3,869,268 assigned to the assignee of the present invention. In this process glass fibers are attenuated, treated with a binder or size and after being gathered into a strand the strand is pulled between a roller having a rubber surface and a second roller having a plurality of cutting blades therein. The glass strand is then chopped between the two rollers as the filaments are being attenuated.

In another process for producing chopped strand the strands are fed to a chopping operation from a forming package. In this process the strand is in dry form. A typical operation of this latter type is shown in K. L. Lowehstein, *The Manufacturing Technology of Continuous Glass Fibers*, Elsevier Scientific Publishing Company (New York: 1973), Pages 266-267.

Both systems have an inherent problem. In each, the chopping of the strands causes the cutting blades to wear, necessitating frequent interruptions in production to replace worn parts. It would be desirable, therefore, to provide a system for cutting glass fibers without the necessity of cutting blades.

THE PRESENT INVENTION

In accordance with the present invention, glass fiber strand is driven across a pulsating laser beam. As the strand crosses the beam, the beam melts the glass fiber strand at each pulse thus cutting the strand into small lengths. The lengths can be controlled by varying the speed of travel of the strand across the beam, by varying the pulsating rate of the beam, or a combination of these variations. If the glass strand is being cut immediately from attenuation, the cut strand can be packaged wet or can be subjected to a drying treatment after cutting and prior to packaging. Previously formed strand, for example, a dried forming package of glass strand, can also be cut in the manner of the present invention and directly packaged.

DETAILED DESCRIPTION OF THE DRAWINGS

Figure 1:
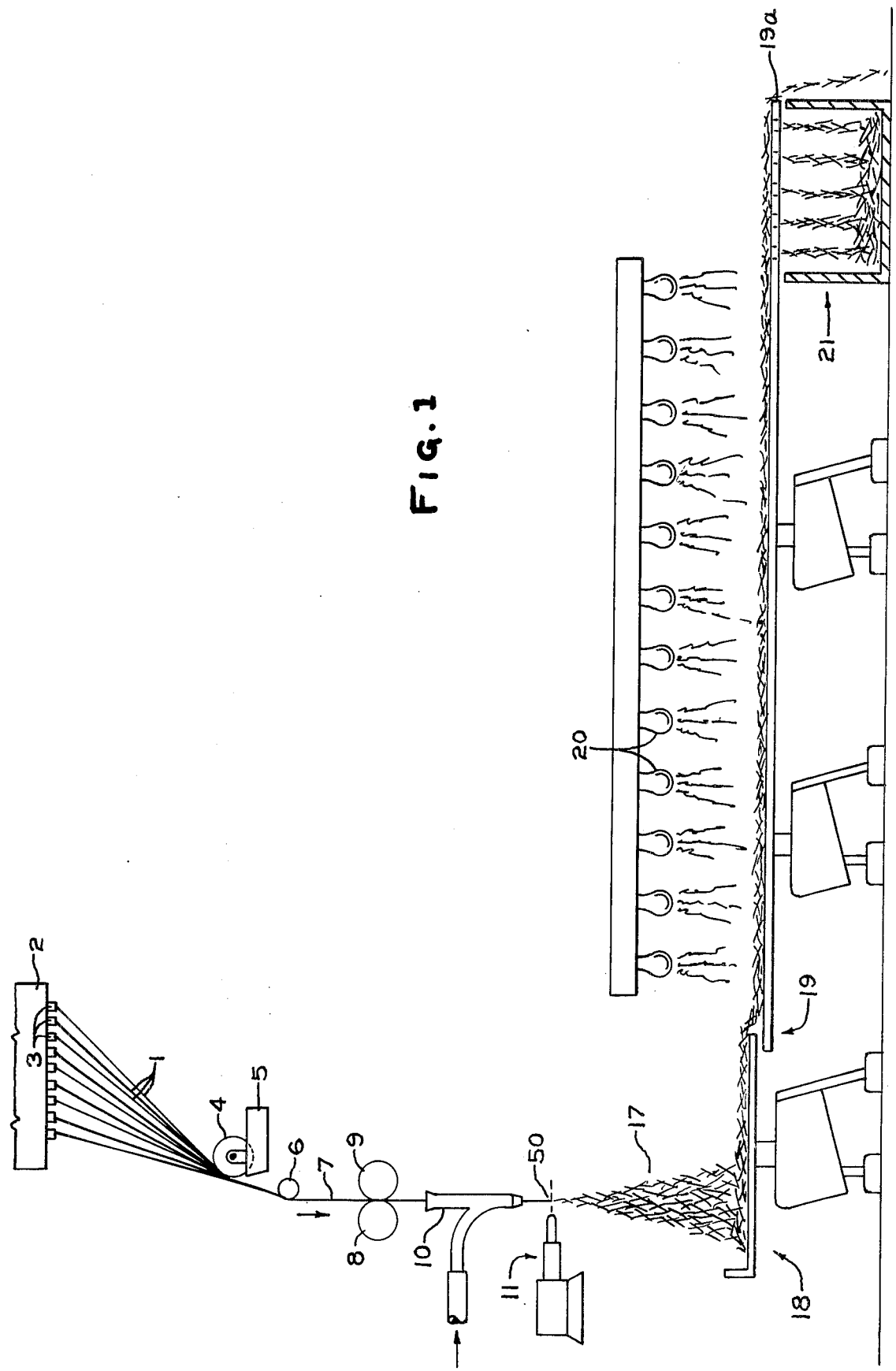
FIG. 1 is a diagrammatic illustration of a method of forming cut glass strands directly after attenuation from a bushing according to the present invention.

Referring now to FIG. 1 glass filaments 1 are attenuated through tips or orifices 3 in a bushing 2. The fibers are preferably passed over an applicator 4 connected to a supply of lubricant binder and/or size 5 and are coated with the lubricant or size. The filaments are gathered into a unified strand 7 by a gathering shoe 6. Alternatively, prior to forming the filaments into a unified strand 7 the glass filaments may be sprayed with water and the lubricant coating step omitted. The unified strand 7 is pulled by a pair of nip rollers 8 and 9. These rollers produce the attenuation forces necessary to form the glass filaments 1. The strand 7 is passed through an air venturi 10. This venturi blows air and the strand across an interruptable laser beam apparatus 11. This apparatus is generally illustrated in FIG. 1 and is shown in greater detail in FIG. 2. The interrupted beam 50 melts the glass strand 7 regularly thus forming a plurality of short lengths of glass strand 17. By varying the rate of interruption of the laser beam 50, the rate of passing the glass strand across the laser beam, or a combination of these variations, lengths of glass strand of varying sizes can be formed. Lengths of from about 0.0625 inch (0.159 centimeter) to about 1.50 inch (3.81 centimeter) or even larger can be formed in this manner. In the preferred embodiment, the cut glass strand 17 passes to a two-stage vibrating conveyor. The first stage 18 is vibrated at a higher amplitude than the second stage 19. Above the second stage 19 is located an infrared heated apparatus 20 which dries the cut glass strands prior to their collection. At the end of the second conveyor 19 there is a foraminous area 19a which allows properly sized fibers to fall into package 21 while oversized cut strand is discarded. The operation of the drying and collecting means is more fully disclosed in U.S. Pat. No. 3,869,268, which is incorporated herein by reference.

Alternatively, and especially when the glass filaments 1 are sprayed with water and the lubricant omitted, the cut strand 17 can be immediately collected as it passes from the laser beam 11 and packaged as a wet cut strand.

Figure 2:
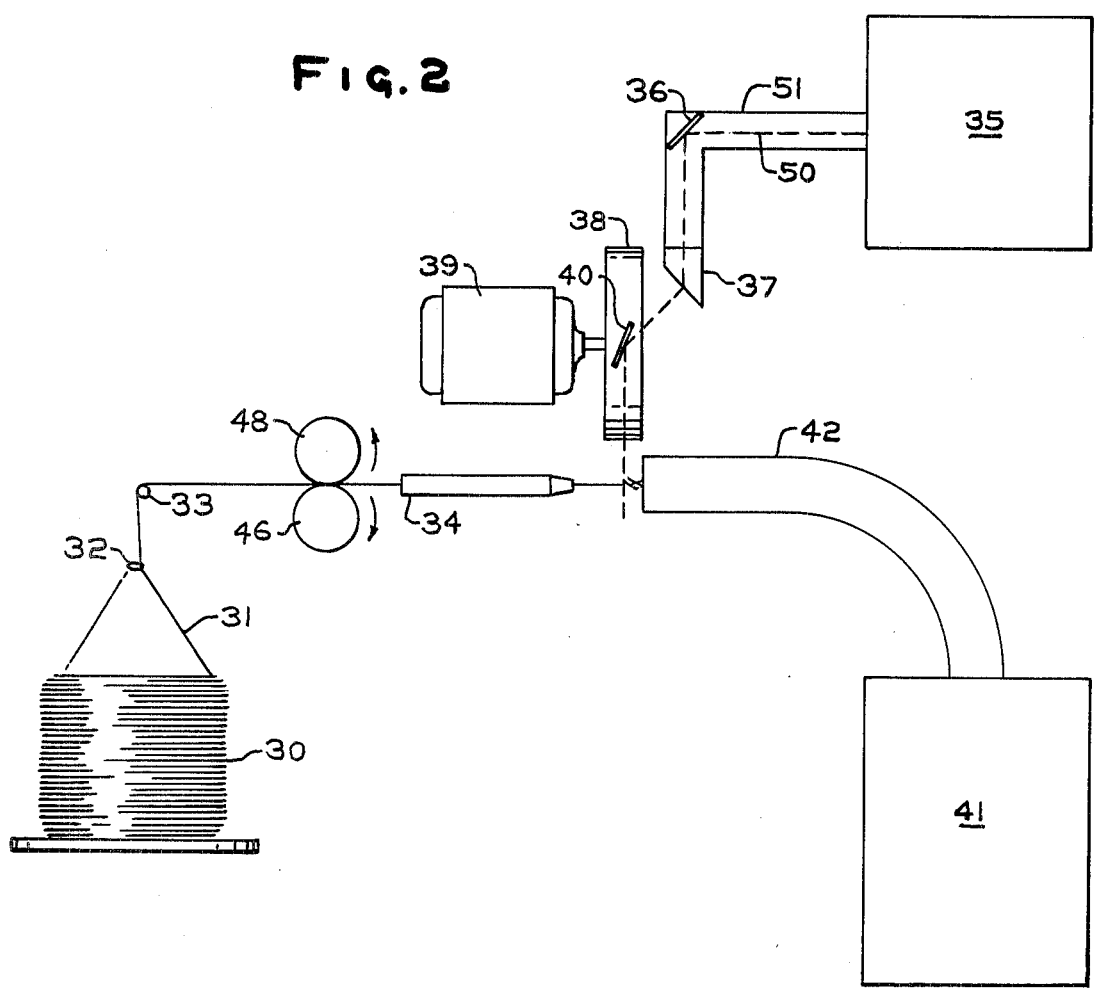
FIG. 2 is a diagrammatic illustration of cutting glass strands from a forming package according to the present invention.

In FIG. 2, a forming package 30 is illustrated as a source of glass fiber strand 31. The strand 31 passes through guides 32 and 33 between pull rolls 46 and 48 and through tube guide 34. The strand is pulled through the tube guide 34 by the vacuum forces produced by vacuum-tank 41. As the strand exits the tube guide 34 it crosses the interrupted laser beam 50. The beam 50 is formed by generator 35. It passes from the generator in a straight line and is reflected by mirror 36 to a 45° lens 37. The beam 50 passes through the lens 37 and onto rotating interrupter 38 which is driven by motor 39. As the interrupter 38 rotates the beam 50 will line up with mirror 40 regularly. At those points, the beam 50 passes across the path of the glass fiber strand 31 and melts the strand into individual lengths. While in this embodiment a continuous beam 50 is employed with an interruptor 38 such that the glass strand 31 is cut by a pulsed beam, it is equally feasible to form the pulsating beam from a pulsating generator, eliminating the need for the interruptor 38. Due to the vacuum forces of tank 41 the cut glass strands are pulled through line 42 into a collection area in the vacuum tank 41.

Figure 3:
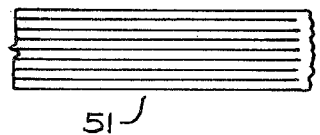
FIG. 3 diagrammatically illustrates the configuration of an end of a glass strand cut according to the present invention.
Figure 4:
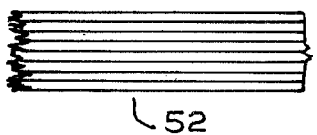
FIG. 4 diagrammatically illustrates an end of a chopped glass strand formed by conventional chopping apparatus.

FIGS. 3 and 4 illustrate the differences between chopped glass strands formed by conventional mechanical chopping means and the cut glass strand formed by the present invention. As can be seen in FIG. 4, conventional chopped glass strand has ends which are loose and uneven. The ends formed by the present invention, as can be seen in FIG. 3, are fairly even. In addition, the ends of the individual filaments within the strand are fused together into a single piece.

EXAMPLE I

Using the apparatus as illustrated in FIG. 2, a forming package 30 of K-75 glass fiber strand 31 was pulled between pull rolls 46 and 48 and guided by tube guide 34 across an interrupted laser beam at a rate of 2,500 feet per minute (762 meters per minute). Laser generator 35 produced a beam having an intensity of 500 miliwatts. The beam interrupter 38 was rotated at 3,600 revolutions per minute. This resulted in the formation of glass fiber lengths of 0.125 inch (0.318 centimeter).

EXAMPLE II

Example I was repeated with the beam interruptor 38 being rotated at 1,800 revolutions per minute. This produced glass fiber lengths of 0.25 inch (0.635 centimeter).

The cut glass strand produced in this manner had a high degree of uniformity in length. The ends of the individual lengths were fairly even and the ends of the individual filaments were fused to each other as in FIG. 3.

From the foregoing description it will be apparent that the instant invention provides an efficient apparatus and method for cutting glass fiber strands. Further, although the description above is to a specifically constructed apparatus and method, the invention is not to be limited in any way only insofar as is set forth in the accompanying claims.

I claim:

1. A method of cutting glass fiber strand comprising feeding said strand across a pulsating laser beam and cutting said strand with said pulsating laser beam, said feeding of strand being at a sufficient rate and said laser beam operating at a sufficient intensity to produce cut strands having end portions which are approximately even and fused into a single piece.

2. The method of claim 1 wherein said strand is fed at a rate of 2,500 feet per minute (762 meters per minute).

3. The method of claim 1 wherein said laser beam is operated at an intensity of 500 milliwatts.

4. In a method of cutting glass fiber strand comprising attenuating glass filaments from a bushing, consolidating said filaments into a glass fiber strand and cutting said strand, the improvement wherein said cutting comprises feeding said strand across an interrupted laser beam and cutting said strand with said interrupted laser beam, said strand being fed at a sufficient rate and said laser beam operating at a sufficient intensity so as to produce cut strands having end portions which are approximately even and fused into a single piece.

5. The method of claim 4 wherein said strand feed is at a rate of 2,500 feet per minute (762 meters per minute).

6. The method of claim 4 wherein said laser beam is operated at an intensity of 500 milliwatts.

7. The method of claim 1 wherein said strand is fed into an air venturi tube to thoroughly blow air and said strand through said tube and across said pulsating laser beam.

8. The method of claim 1 wherein said pulsating laser beam is varied in its rate of pulsation to produce cut strand of different lengths.

9. The method of claim 7 wherein the feeding of strand across the beam is varied in its rate of speed to produce cut strand of different lengths.

10. The method of claim 1 further comprising collecting the cut strand.

11. The method of claim 10 wherein said collecting comprises drawing said cut strands into a container under vacuum.

12. The method of claim 1 further comprising drying said cut strand and collecting the resulting dried cut strand.

13. The method of claim 12 wherein said drying comprises passing said cut strand under an infrared drying means.

14. Cut glass strand formed by the process of claim 1.

15. The method of claim 4 wherein said cutting comprises feeding said strand into an air venturi tube and blowing air and said strand through said tube and across said interrupted laser beam.

16. The method of claim 4 wherein said interrupted laser beam is varied in its rate of interruption to produce cut strand of various lengths.

17. The method of claim 15 wherein said cutting is varied in its rate of speed to produce cut strand of various lengths.

18. The method of claim 4 further comprises collecting the cut strand.

19. The method of claim 18 wherein said collecting comprises drawing said cut strand into a container under vacuum.

20. The method of claim 4 further comprising drying said cut strand and collecting the resulting dried cut strand.

21. The method of claim 20 wherein said drying comprises passing said cut strand under an infrared drying means.

22. Cut glass strand formed by the process of claim 4.

23. Cut glass strand formed by the process of claim 20.

24. Cut glass strand formed by the process of claim 12.

* * * * *